United States Patent
Akasaka et al.

(10) Patent No.: US 9,349,082 B2
(45) Date of Patent: *May 24, 2016

(54) RECORDING DATA GENERATION APPARATUS, RECORDING SYSTEM, PROGRAM, RECORDING DATA GENERATION METHOD AND IMAGE DATA DISPLAY METHOD

(71) Applicant: SEIKO EPSON CORPORATION, Tokyo (JP)

(72) Inventors: Tatsuo Akasaka, Shiojiri (JP); Takuya Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,749

(22) Filed: Mar. 26, 2015

(65) Prior Publication Data
US 2015/0199596 A1 Jul. 16, 2015

Related U.S. Application Data

(63) Continuation of application No. 14/102,372, filed on Dec. 10, 2013, now Pat. No. 9,019,559.

(30) Foreign Application Priority Data

Dec. 11, 2012 (JP) .................................. 2012-270143

(51) Int. Cl.
*G06K 15/02* (2006.01)
*H04N 1/62* (2006.01)
*H04N 1/46* (2006.01)

(52) U.S. Cl.
CPC .............. *G06K 15/1878* (2013.01); *H04N 1/46* (2013.01); *H04N 1/62* (2013.01)

(58) Field of Classification Search
None
See application file for complete search history.

(56) References Cited

U.S. PATENT DOCUMENTS

| 4,855,765 A | 8/1989 | Suzuki et al. |
| 8,194,089 B1 | 6/2012 | Ante et al. |
| 8,620,072 B2 | 12/2013 | Tomohiro |
| 2003/0053094 A1 | 3/2003 | Ohga et al. |

(Continued)

FOREIGN PATENT DOCUMENTS

JP 63-046071 2/1988

OTHER PUBLICATIONS

U.S. Appl. No. 14/102,372, Sep. 29, 2014, Office Action.

(Continued)

*Primary Examiner* — Kimberly A Williams
(74) *Attorney, Agent, or Firm* — Workman Nydegger

(57) ABSTRACT

Included are a display portion that displays image data; a selection portion that allows selection of a partial pixel from amongst the pixels of image data; a color range setting portion that allows setting a color range on the basis of a color of the partial pixel; a determination portion that determines whether or not an image pixel constituting falls within the color range; a determination practice portion that sequentially performs this determination until the pixel adjacent to a determination-completed pixel becomes a pixel not falling within the color range; a pixel designation portion that designates at least one pixel as falling within the color range; a color conversion portion that converts a color of each pixel designated by the pixel designation portion; and a recording data generation portion that generates recording data on the basis of image data resulting from the color conversion.

4 Claims, 14 Drawing Sheets

(56) References Cited

U.S. PATENT DOCUMENTS

| | | |
|---|---|---|
| 2004/0057614 A1 | 3/2004 | Ogatsu et al. |
| 2005/0162426 A1* | 7/2005 | Okada .......................... 345/467 |
| 2007/0216924 A1 | 9/2007 | Watanabe |
| 2007/0247679 A1 | 10/2007 | Pettigrew et al. |
| 2008/0062193 A1 | 3/2008 | Olson |
| 2009/0214109 A1 | 8/2009 | Nakashima et al. |
| 2009/0273609 A1 | 11/2009 | Ohnishi |
| 2010/0188415 A1 | 7/2010 | Pettigrew et al. |
| 2012/0045126 A1 | 2/2012 | Tomohiro |
| 2012/0210274 A1 | 8/2012 | Pettigrew et al. |
| 2013/0120442 A1 | 5/2013 | Dhawan |
| 2013/0235069 A1 | 9/2013 | Ubillos et al. |
| 2013/0307865 A1 | 11/2013 | Manabe |
| 2013/0329994 A1 | 12/2013 | Webb et al. |

OTHER PUBLICATIONS

U.S. Appl. No. 14/102,372, Dec. 26, 2014, Notice of Allowance.

* cited by examiner

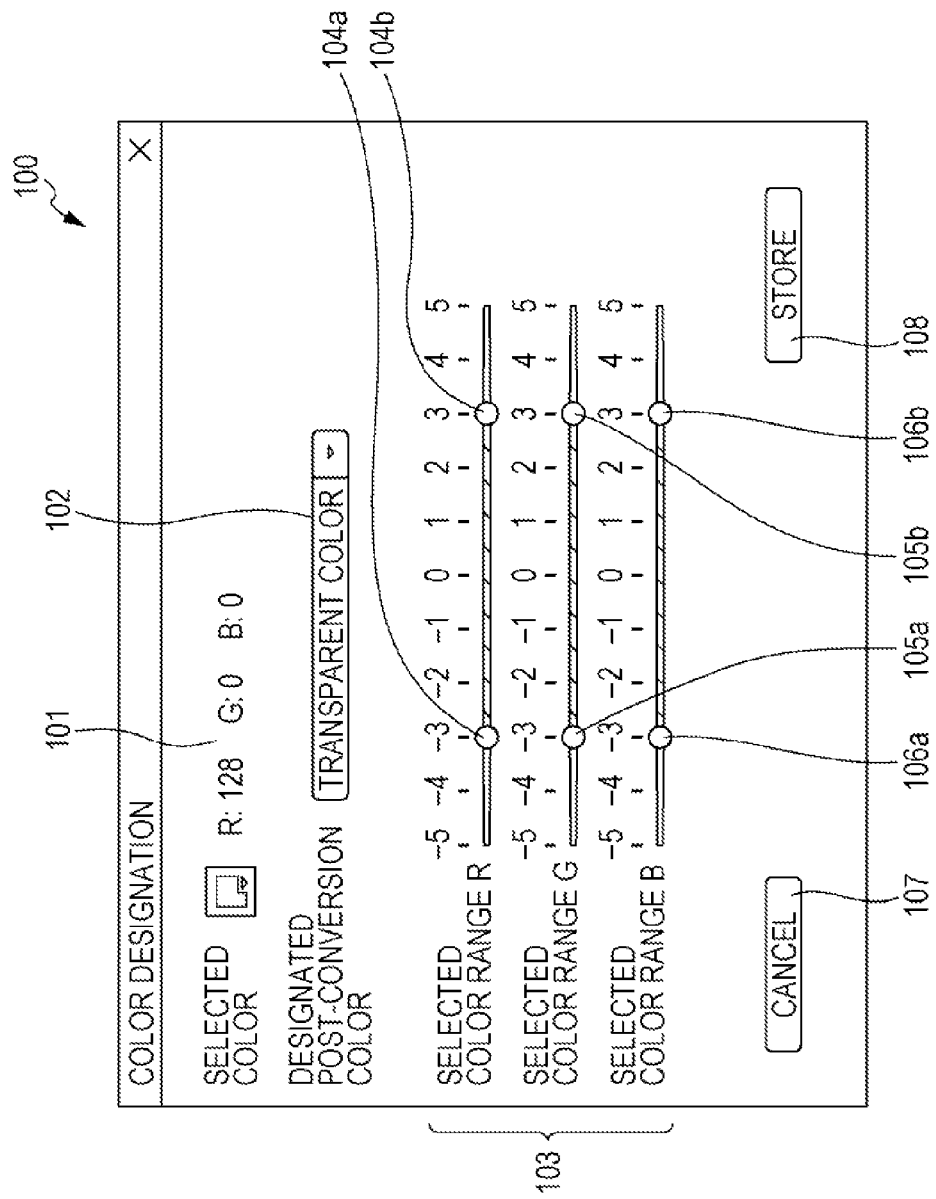

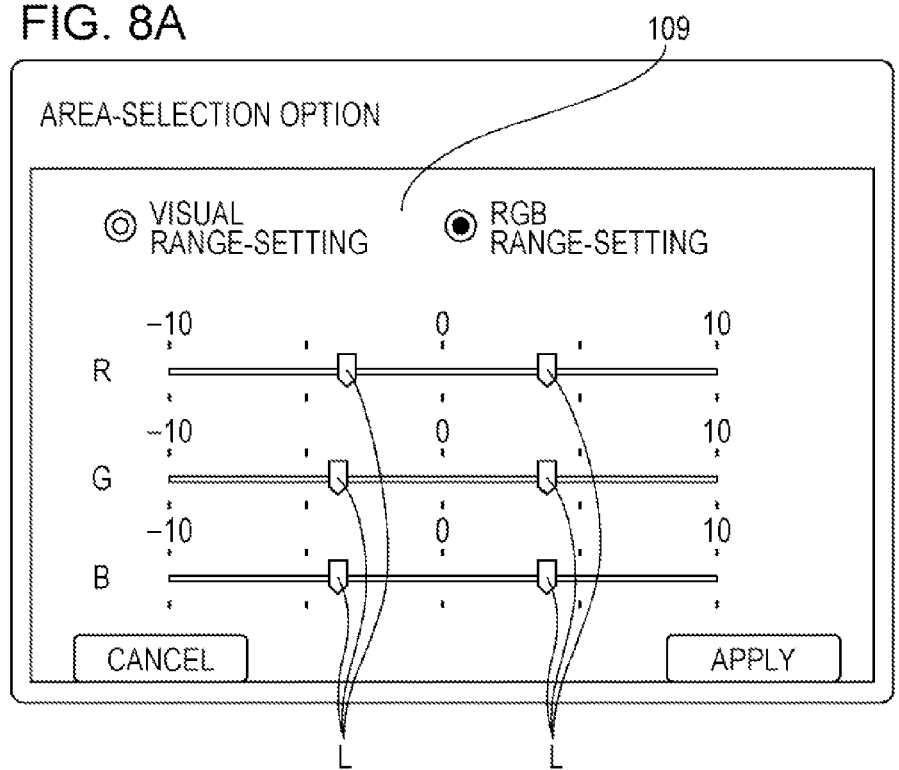
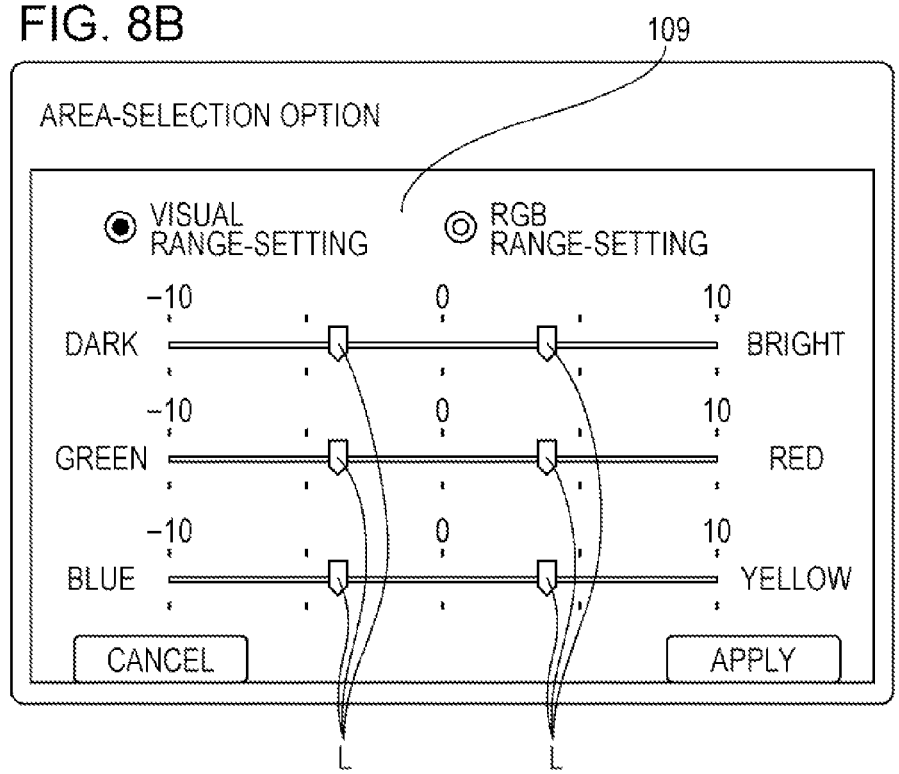

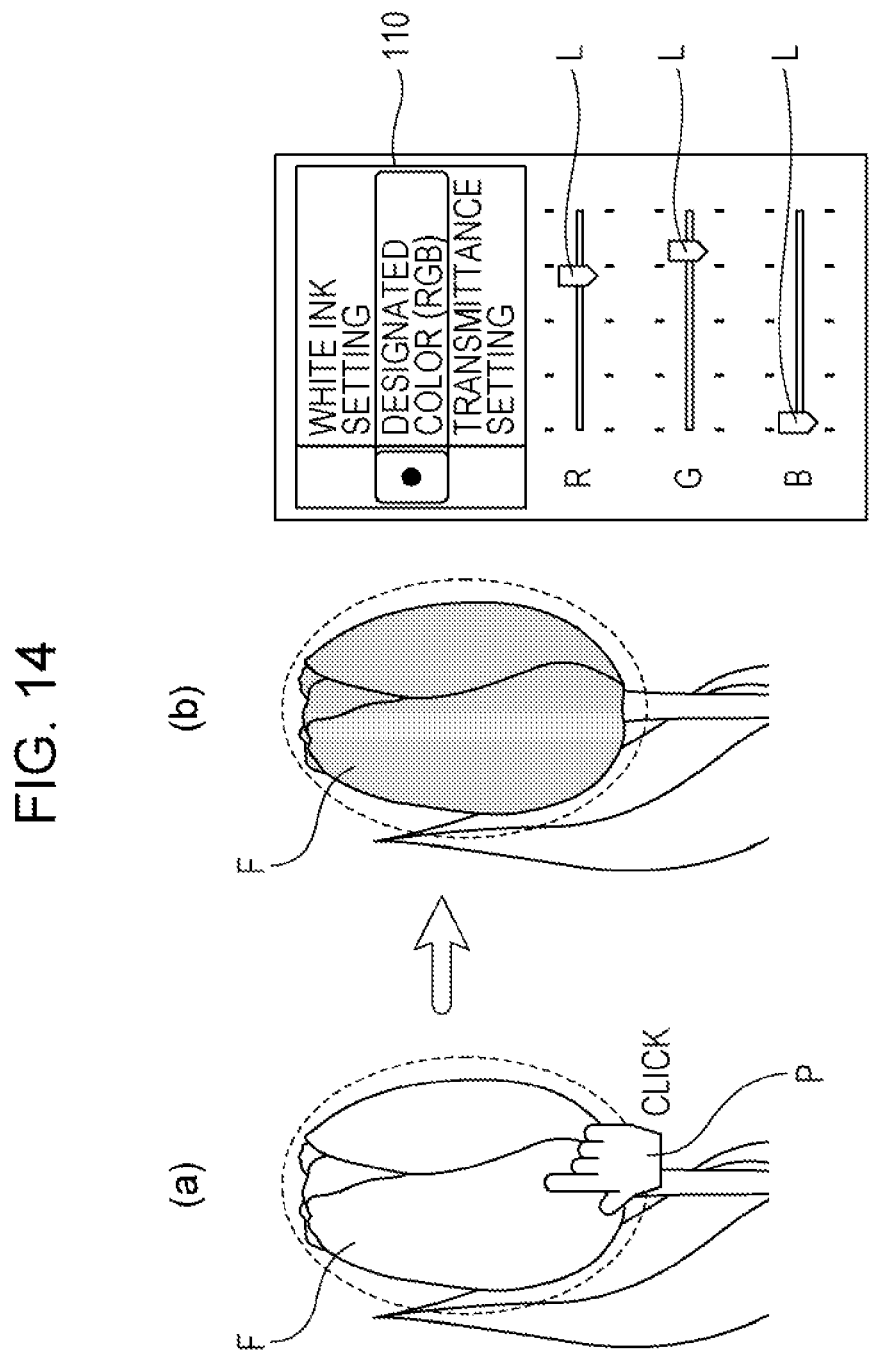

RECORDING DATA GENERATION APPARATUS, RECORDING SYSTEM, PROGRAM, RECORDING DATA GENERATION METHOD AND IMAGE DATA DISPLAY METHOD

This application is a continuation application of U.S. patent application Ser. No. 14/102,372, filed Dec. 10, 2013, which patent application is incorporated herein by reference in its entirety. U.S. patent application Ser. No. 14/102,372 claims the benefit of and priority to Japanese Patent Application No. 2012-270143 filed Dec. 11, 2012, the contents of which are hereby incorporated by reference in its entirety.

BACKGROUND

1. Technical Field

The present invention relates to a recording data generation apparatus, a recording system, a program, a recording data generation method and an image data display method.

2. Related Art

Heretofore, there have been utilized recording data generation apparatuses, each generating recording data for use in recording operation of a recording apparatus on the basis of image data. In such a recording data generation apparatus, processing that converts a specific color in image data into a different color is frequently performed.

For example, in JP-A-63-46071, there has been disclosed an image processing method which makes it possible to select a post-conversion color from among a plurality of colors when converting a specific color in image data into a different color.

Meanwhile, when converting a specific color within a desired area of image data, sometimes it is not easy to select the specific color. For example, when converting only a specific color within a desired area of image data, if the desired area is hard to be designated with accuracy, the specific color in areas other than the desired area is likely to be converted. Further, when attempting to designate the inside of a desired area of image data with accuracy, there are some cases where the designation is difficult depending on the property of the image data.

Nevertheless, the image processing method disclosed in JP-A-63-46071 is not a technology which makes it easy to select the specific color when converting a specific color within a desired area of image data into a different color.

SUMMARY

An advantage of some aspects of the invention is to make it easy to select a specific color, when converting the specific color within a desired area of image data into a different color.

A recording data generation apparatus according to a first aspect of the invention, which generates recording data for use in recording operation of a recording apparatus on the basis of image data, includes a display portion that displays the image data; a selection portion that allows selection of a partial pixel from among pixels constituting the image data displayed on the display portion; a color range setting portion that allows setting a color range on the basis of a color of the partial pixel; a determination portion that determines whether or not a pixel constituting the image data is a pixel falling within the color range; a determination practice portion that causes the determination made by the determination portion to be sequentially practiced with respect to a pixel adjacent to a determination-completed pixel on the basis of the partial pixel until the pixel adjacent to a determination-completed pixel becomes a pixel not falling within the color range; a pixel designation portion that designates at least one pixel which is determined as a pixel falling within the color range by the determination portion; a color conversion portion that converts a color of each of the at least one pixel designated by the pixel designation portion; and a recording data generation portion that generates recording data on the basis of image data resulting from the color conversion by the color conversion portion with respect to a color of each of the at least one pixel designated by the pixel designation portion.

Here, "allowing setting a color range on the basis of a color of the partial pixel" corresponds to a case where, for example, when a color of the partial pixel is represented by RGB values each being one of 256 gray-scale levels, the relevant color range can be set so as to cover, for each of RGB colors, a range having a desired amplitude relative to its center which is placed at a corresponding one of the RGB values representing the color of the partial pixel. In addition, besides such a configuration represented by RGB values, a different configuration represented by L*a*b* values or the like may be employed.

According to this aspect, through the selection of a partial pixel from among pixels included in a desired area of image data as well as the setting of a color range based on a color of the partial pixel, an area of pixels to be color converted can be made within the desired area on the basis of the partial pixel. Thus, it becomes easy to select pixels which are desired to be color converted. That is, it is possible to make it easy to, when converting a specific color in a desired area of image data, select the specific color. Further, it is possible to make it easy for the color conversion portion to convert a color of each of pixels included in a desired area into a desired color.

A recording data generation apparatus according to a second aspect of the invention is configured such that, in the first aspect, the color conversion portion allows the conversion of a color of each of the at least one pixel designated by the pixel designation portion into any one of a transparent color, a white color and a designated color, and the recording data generation apparatus includes a color designation portion that allows designation of any color as a color of the designated color.

According to this aspect, it is possible to easily convert a color of each of the pixels designated by the pixel designation portion into any one of three kinds of color, that is, the transparent color, the white color and the designated color. Further, it is possible to select any color as the designated color.

A recording data generation apparatus according to a third aspect of the invention is configured such that, in the second aspect, a storage portion that stores therein a pre-conversion color of each of the at least one pixel designated by the pixel designation portion is further provided, and the color designation portion performs designation of a post-conversion color of each of the at least one pixel designated by the pixel designation portion by varying a pre-conversion color of the each of the at least one pixel such that an amount of the variation corresponds to an amount of a variation of a pre-conversion color which is associated with any one of the at least one pixel and is stored in the storage portion.

According to this aspect, as a result, a variation between post-conversion colors of any two ones of the pixels corresponds to a variation between pre-conversion colors of the any two ones of the pixels. That is, the gradation of the selected pixels before a color conversion can be kept in the gradation of the selected pixels after the color conversion.

A recording data generation apparatus according to a fourth aspect of the invention is configured such that, in the second aspect or the third aspect, the color conversion portion causes a data processing method for converting a color of each of the at least one pixel designated by the pixel designation portion into the transparent color or the white color to differ from a data processing method for converting the color of each of the at least one pixel designated by the pixel designation portion into the designated color.

When recording in the designated color is performed, sometimes, irrespective of color matching or the like, a specific mark or the like is recorded in a specific color. Thus, there are some cases where a data processing method different from that for recording in the transparent color or the white color is required. According to this aspect, it is possible to deal with such a requirement without any trouble.

That is, it is possible to deal with such a requirement by, for example, employing a process in which, when data corresponding to each of the designated pixels is converted into data based on the transparent color or the white color, RGB data is directly converted into CMYK data, and when data corresponding to each of the designated pixels is converted into data based on the designated color, RGB data is converted into different RGB data, and then, the different RGB data is converted into CMYK data.

A recording data generation apparatus according to a fifth aspect of the invention is configured such that, in any one of the first to fourth aspects, the selection portion allows selection of a plurality of pixels from among the pixels constituting the image data, and the color range setting portion allows setting a color range on the basis of an average value of colors each associated with a corresponding one of the plurality of pixels.

According to this aspect, it is possible to set a color range on the basis of an average value of colors each associated with a corresponding one of a plurality of pixels. Thus, in the case where colors each associated with a corresponding one of pixels to be targeted for designation by the pixel designation portion are not uniform, it becomes possible to designate the pixels to be targeted for designation more accurately because an average value of colors each associated with a corresponding one of the plurality of pixels among the pixels to be targeted for designation can be made a basis of the designation.

A recording data generation apparatus according to a sixth aspect of the invention is configured such that, in the fifth aspect, the selection portion allows further selection of a partial pixel from at least one pixel included in the color range set by using the color range setting portion.

According to this aspect, it becomes possible to designate pixels to be targeted for destination more accurately than in the fifth aspect, particularly in image data including various colors in a narrow area.

A recording system according to a seventh aspect of the invention includes the recording data generation apparatus according to any one of the first to sixth aspects; and a recording apparatus that performs recording on the basis of recording data generated by the recording data generation apparatus.

According to this aspect, it is possible to make it easy to, when converting a specific color in a desired area of image data, select the specific color. Further, it is possible to easily convert a color of each of pixels included in a desired area into a desired color and perform recording.

A program according to an eight aspect of the invention, which generates recording data for use in recording operation of a recording apparatus on the basis of image data, causes a computer to function as an apparatus including the portions of a display portion that displays the image data; a selection portion that allows selection of a partial pixel from among pixels constituting the image data displayed on the display portion; a color range setting portion that allows setting a color range on the basis of a color of the partial pixel; a determination portion that determines whether or not a pixel constituting the image data is a pixel falling within the color range; a determination practice portion that causes the determination made by the determination portion to be sequentially practiced with respect to a pixel adjacent to a determination-completed pixel on the basis of the partial pixel until the pixel adjacent to a determination-completed pixel becomes a pixel not falling within the color range; a pixel designation portion that designates at least one pixel which is determined as a pixel falling within the color range by the determination portion; a color conversion portion that converts a color of each of the at least one pixel designated by the pixel designation portion; and a recording data generation portion that generates recording data on the basis of image data resulting from the color conversion by the color conversion portion with respect to a color of each of the at least one pixel designated by the pixel designation portion.

According to this aspect, it is possible to make it easy to, when converting a specific color in a desired area of image data, select the specific color. Further, it is possible to make it easy to convert a color of each of pixels included in a desired area into a desired color.

A recording data generation method according to a ninth aspect of the invention, which is used for generating recording data for use in recording operation of a recording apparatus on the basis of image data, includes a display process of displaying the image data; a selection process of selecting a partial pixel from among pixels constituting the image data displayed on the display portion; a color range setting process of setting a color range on the basis of a color of the partial pixel; a determination practice process of causing a determination process of determining whether or not a pixel included in the pixels constituting the image data is a pixel falling within the color range to be sequentially practiced with respect to a pixel adjacent to a previously determined pixel on the basis of the partial pixel until the pixel adjacent to a previously determined pixel becomes a pixel not falling within the color range; a pixel designation process of designating at least one pixel which is determined to be a pixel falling within the color range by the determination process; a color conversion process of converting a color of each of the at least one pixel designated by the pixel designation process; a recording data generation process of generating recording data on the basis of image data resulting from the color conversion by the color conversion process with respect to a color of each of the at least one pixel designated by the pixel designation process.

According to this aspect, it is possible to make it easy to, when converting a specific color in a desired area of image data, select the specific color. Further, it is possible to make it easy to convert a color of each of pixels included in a desired area into a desired color.

An image data display method according to a tenth aspect of the invention, which is for use in the recording data generation apparatus according to any one of the aspects from the second aspect to the sixth aspect, includes displaying the image data on the display portion such that a color of the image data reflects a ground color of a recording target medium in the case where a color of each of the at least one pixel designated by the pixel designation portion is converted into the transparent color; displaying the image data on the display portion such that a color of the image data reflects a ground color of a recording target medium and a degree of whiteness corresponding to a recording density of a white ink in recording in a white color in the case where a color of each of the at least one pixel designated by the pixel designation portion is converted into the white color; displaying the image data on the display portion such that a color of the image data reflects a color of the designated color and a degree of whiteness corresponding to a recording density of a white ink in recording in a white color in the case where a color of each of the at least one pixel designated by the pixel designation portion is converted into the designated color and recording in a white color is performed; and displaying the image data on the display portion such that a color of the image data reflects a color of the designated color in the case where a color of each of the at least one pixel designated by the pixel designation portion is converted into the designated color and recording in a white color is not performed.

According to this aspect, it becomes possible to display an image in the state close to a recording image actually recorded on a recording target medium.

BRIEF DESCRIPTION OF THE DRAWINGS

The invention will be described with reference to the accompanying drawings, wherein like numbers reference like elements.

FIG. 7 is a diagram illustrating a color range setting screen for use in designation of pixels to be color converted, according to an embodiment of the invention.

FIG. 8A and FIG. 8B are diagrams each illustrating a color range setting screen for use in designation of pixels to be color converted, according to an embodiment of the invention.

FIG. 14 is an example of a display of image data in a designated color, according to an embodiment of the invention.

DESCRIPTION OF EXEMPLARY EMBODIMENTS

Embodiment of Recording Data Generation Apparatus and Recording System (FIGS. 1 to 5)

Hereinafter, a recording data generation apparatus and a recording system according to an embodiment of the invention will be described in detail with reference to the accompanying drawings.

First, a recording apparatus constituting a recording system according to an embodiment of the invention will be described.

Figure 1:
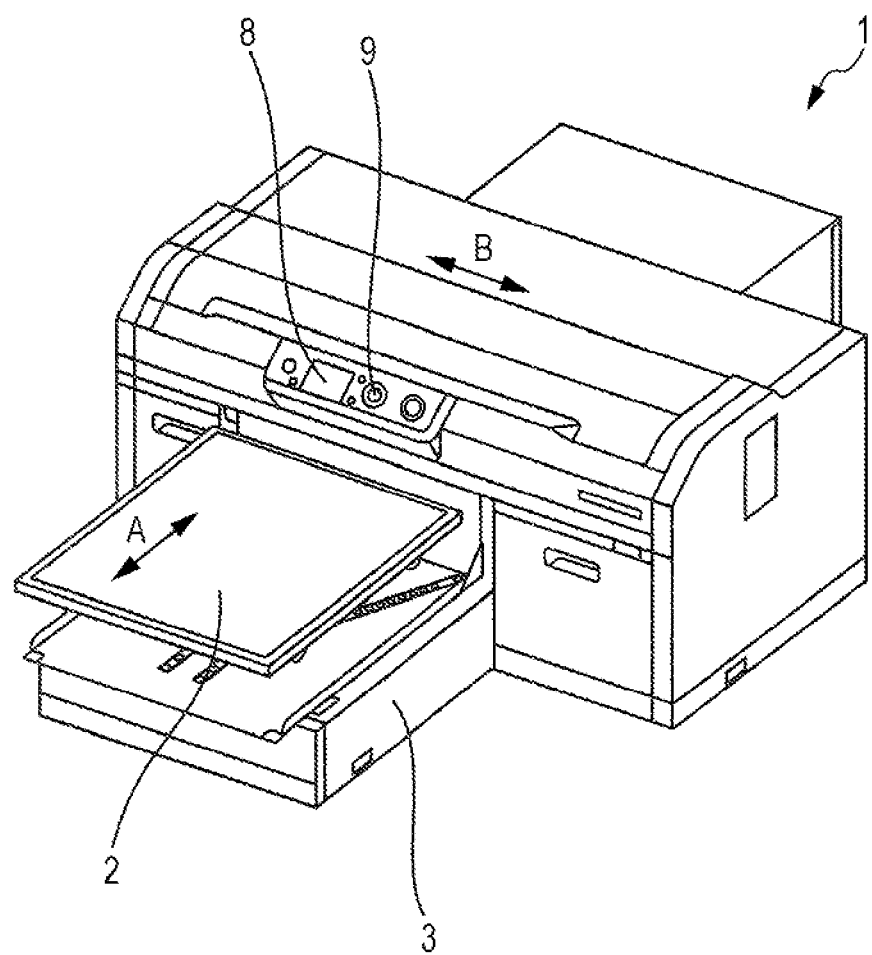
FIG. 1 is an overview perspective view illustrating a recording apparatus constituting a recording system according to an embodiment of the invention.
Figure 2:
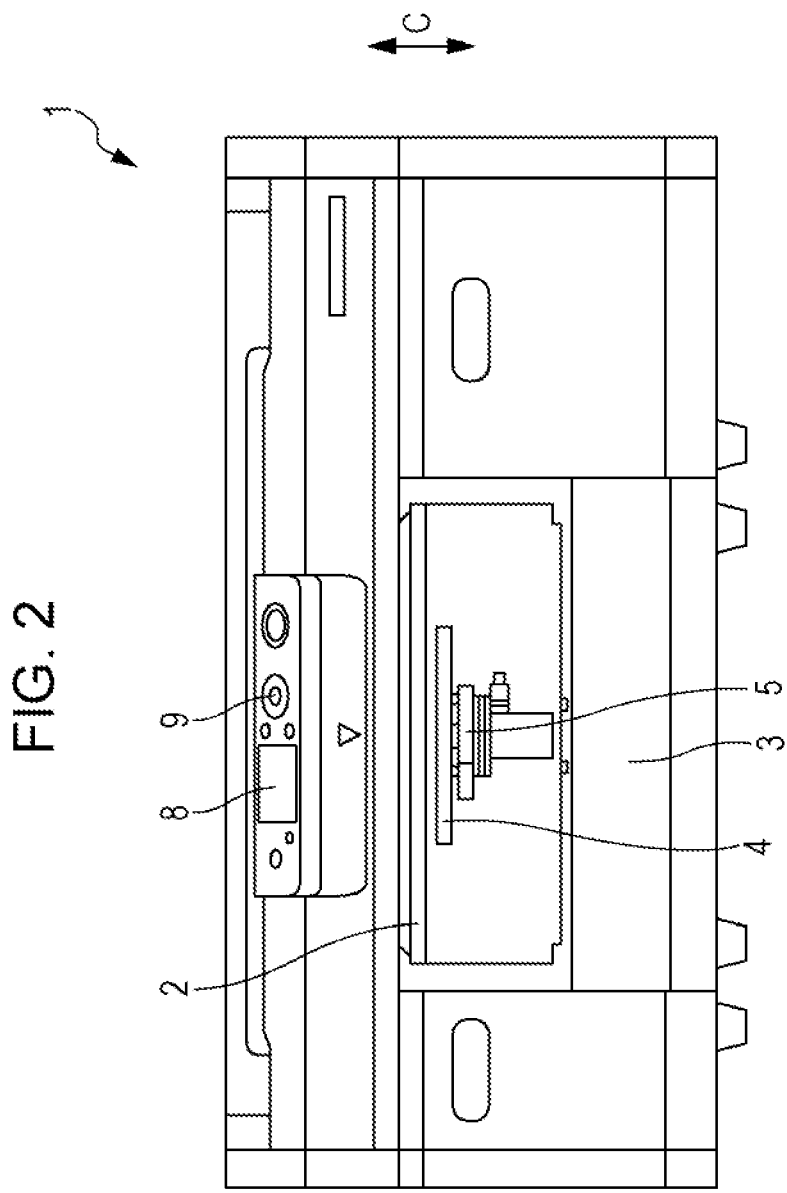
FIG. 2 is an overview plan view illustrating a recording apparatus constituting a recording system according to an embodiment of the invention.

FIG. 1 and FIG. 2 illustrate an overview perspective view and an overview plan view, respectively, of a recording apparatus 1 according to an embodiment of the invention. In addition, the recording apparatus 1 of this embodiment is a recording apparatus configured so as to be capable of performing recording on a fabric as a recording target medium M (refer to FIG. 5), but is not limited to any recording apparatus configured in such a way.

The recording apparatus 1 of this embodiment includes a medium supporting tray 2 for supporting a fabric as the recording target medium M. Further, the recording apparatus 1 includes a movement mechanism 3 for transporting the recording target medium M supported by the medium supporting tray 2 in a transportation direction A. In addition, the movement mechanism 3 of this embodiment is configured so as to move the medium supporting tray 2 (that is, so as to transport the recording target medium M supported by the medium supporting tray 2) relative to a recording head 6 (refer to FIG. 3). Nevertheless, the movement mechanism 3 of this embodiment may be configured so as to move the recording head 6 relative to the medium supporting tray 2, or cause the both to perform relative movement.

Further, the medium supporting tray 2 is supported by a stage 4. The medium supporting tray 2 moves in a height direction C together with the stage 4 in conjunction with the rotation of a rotation lever 5.

Further, the recording head 6 is installed inside the body of the recording apparatus 1. Further, the recording apparatus 1 of this embodiment forms images based on recording data by ejecting inks from the recording head 6 onto the recording target medium M which is transported being supported by the medium supporting tray 2, while reciprocating the recording head 6 in a scanning direction B intersecting with the transportation direction A. In addition, in the recording apparatus 1 of this embodiment, a position at which the recording target medium M is set on the medium supporting tray 2 is located at a front side of the recording apparatus 1 (a left lower portion of FIG. 1), and a recording start position is located at a back side of the recording apparatus 1 (a right upper portion of FIG. 1). After having moved the medium supporting tray 2 to the recording start position, the recording apparatus 1 starts recording and continues the recording while moving the medium supporting tray 2 in a direction towards the front side of the recording apparatus 1.

Further, the recording apparatus 1 includes a monitor 8 and a control panel 9. After having selected desired setting items on menus displayed on the monitor 8 while manipulating the control panel 9, a user can actuate the recording apparatus 1 in accordance with the selected setting items. For example, after having selected a kind of the recording target medium M to be used in subsequent recording, recording modes in the transportation direction A and the scanning direction B, and the like, a user can actuate the recording apparatus 1 in accordance with the selected setting items.

In addition, the recording apparatus 1 includes ink cartridges (not illustrated) each containing a corresponding one of a white ink, a black ink, a cyan ink, a magenta ink and a yellow ink.

Next, an electrical configuration of the recording apparatus 1 of this embodiment will be described.

Figure 3:
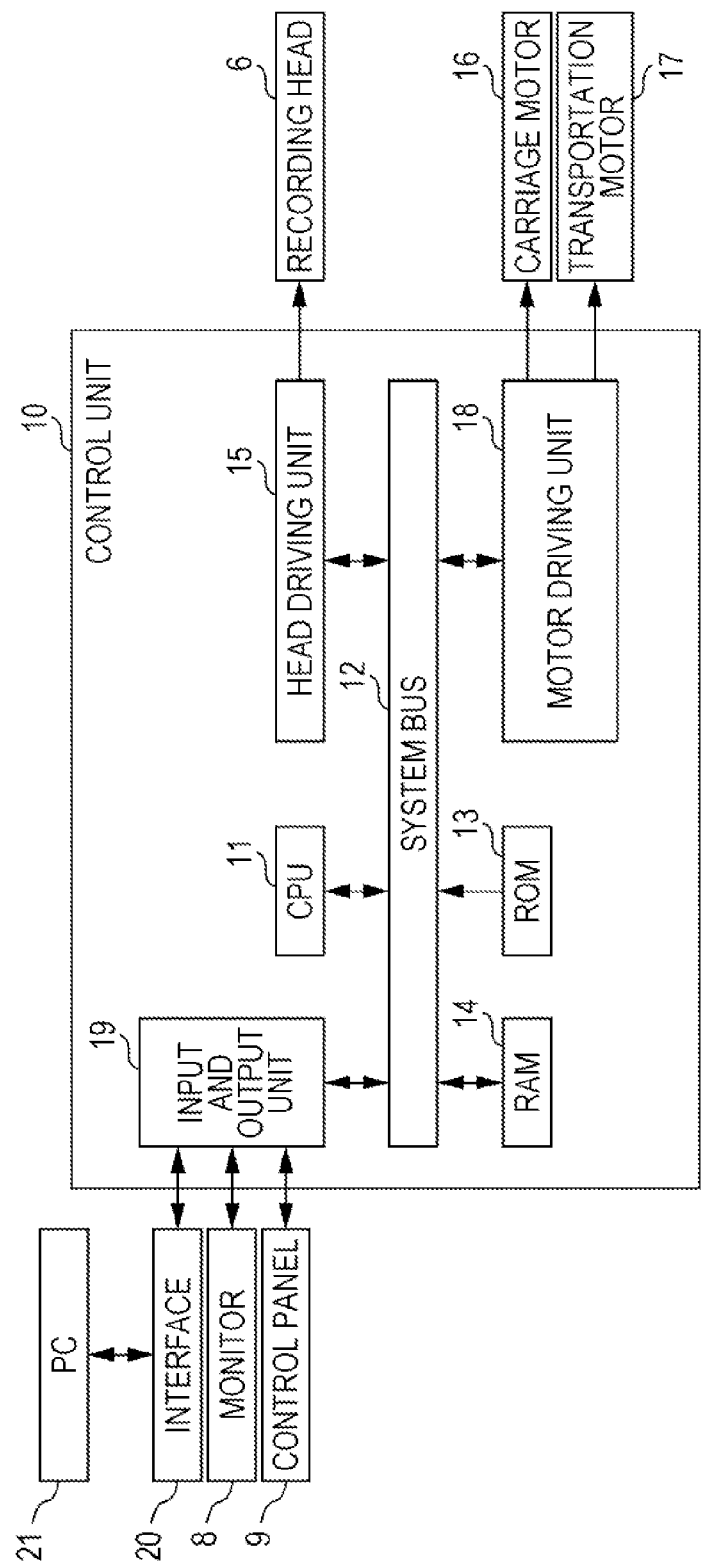
FIG. 3 is a block diagram illustrating a recording system according to an embodiment of the invention.

FIG. 3 is a block diagram of the recording apparatus 1 of this embodiment.

A control unit 10 includes a CPU 11 for performing control of the recording apparatus 1 as a whole. The CPU 11 is electrically connected, via a system bus 12, to a ROM 13 (which stores therein various control programs carried out by the CPU 11, maintenance sequences and the like), and a RAM 14 which is capable of storing data therein temporarily. Further, the CPU 11 is electrically connected to, via the system bus 12, a head driving unit 15 for driving the recording head 6. Further, the CPU 11 is electrically connected to, via the system bus 12, a motor driving unit 18 which drives a carriage motor 16 for moving a carriage on which the recording head 6 is mounted, and which drives a transportation motor 17 for transporting the recording target medium M. Moreover, the CPU 11 is electrically connected to, via the system bus 12, an input and output unit 19 for transmitting and receiving data and signals to/from the monitor 8, the control panel 9 and an interface 20 for performing reception of recording data, and the like, from a PC 21 constituting a recording system of this embodiment, and functioning as a recording data generation apparatus in the recording system.

Next, the PC 21 (constituting a recording system of this embodiment and functioning as a recording data generation apparatus in the recording system) will be described.

Figure 4:
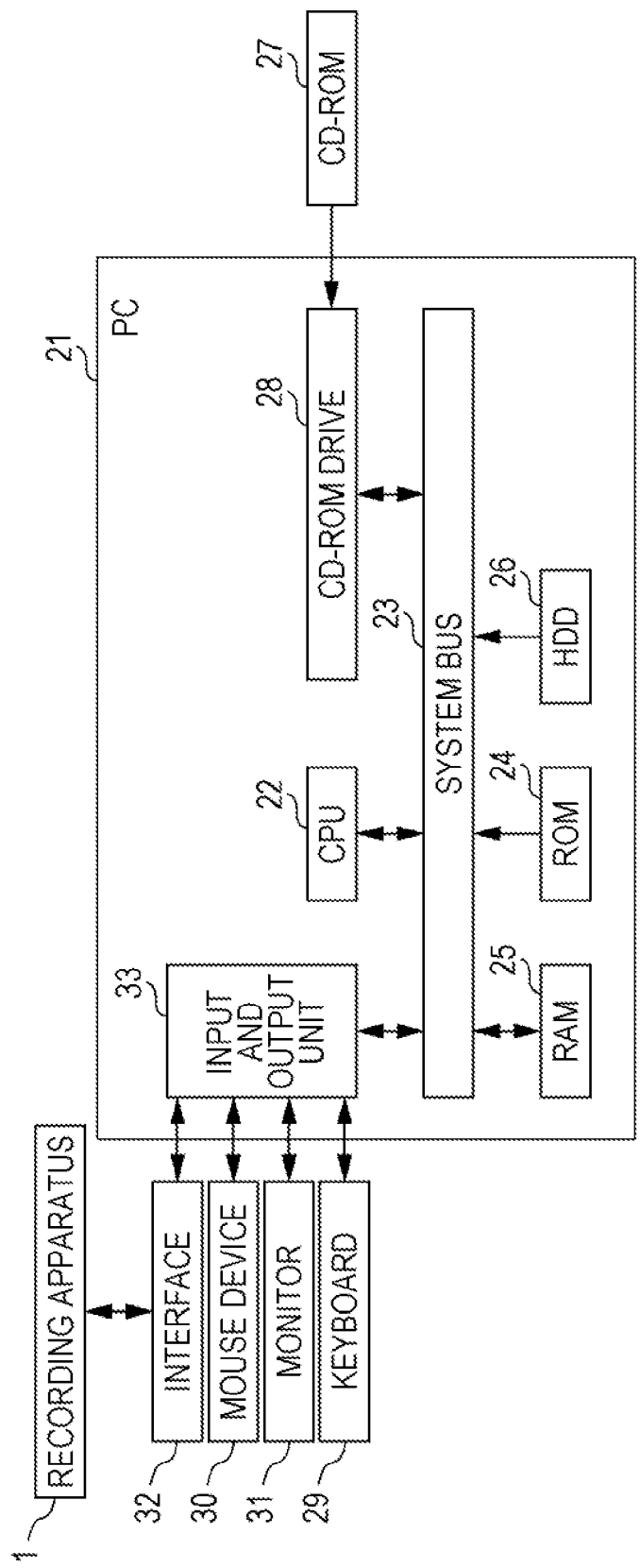
FIG. 4 is a block diagram illustrating a PC constituting a recording system according to an embodiment of the invention.

FIG. 4 is a block diagram illustrating an electrical configuration of the PC 21 of this embodiment.

The PC 21 includes a CPU 22 for performing control of the the PC 21 as a whole. The CPU 22 is electrically connected to, via a system bus 23, a ROM 24 (for storing therein various programs carried out by the CPU 22, and the like), a RAM 25 which is capable of temporarily storing data therein, and a HDD 26, which is a data storage device. Further, the CPU 22 is electrically connected to, via the system bus 23, a CD-ROM drive 28 which is capable of reading data from a CD-ROM 27 functioning as a data storage medium and being inserted in the CD-ROM drive 28. Moreover, the CPU 22 is electrically connected to, via the system bus 23, an input and output unit 33 (for transmitting and receiving data and signals to/from a keyboard 29, a mouse device 30, a monitor 31, and an interface 32 for outputting recording data, and the like) to the recording apparatus 1.

Figure 5:
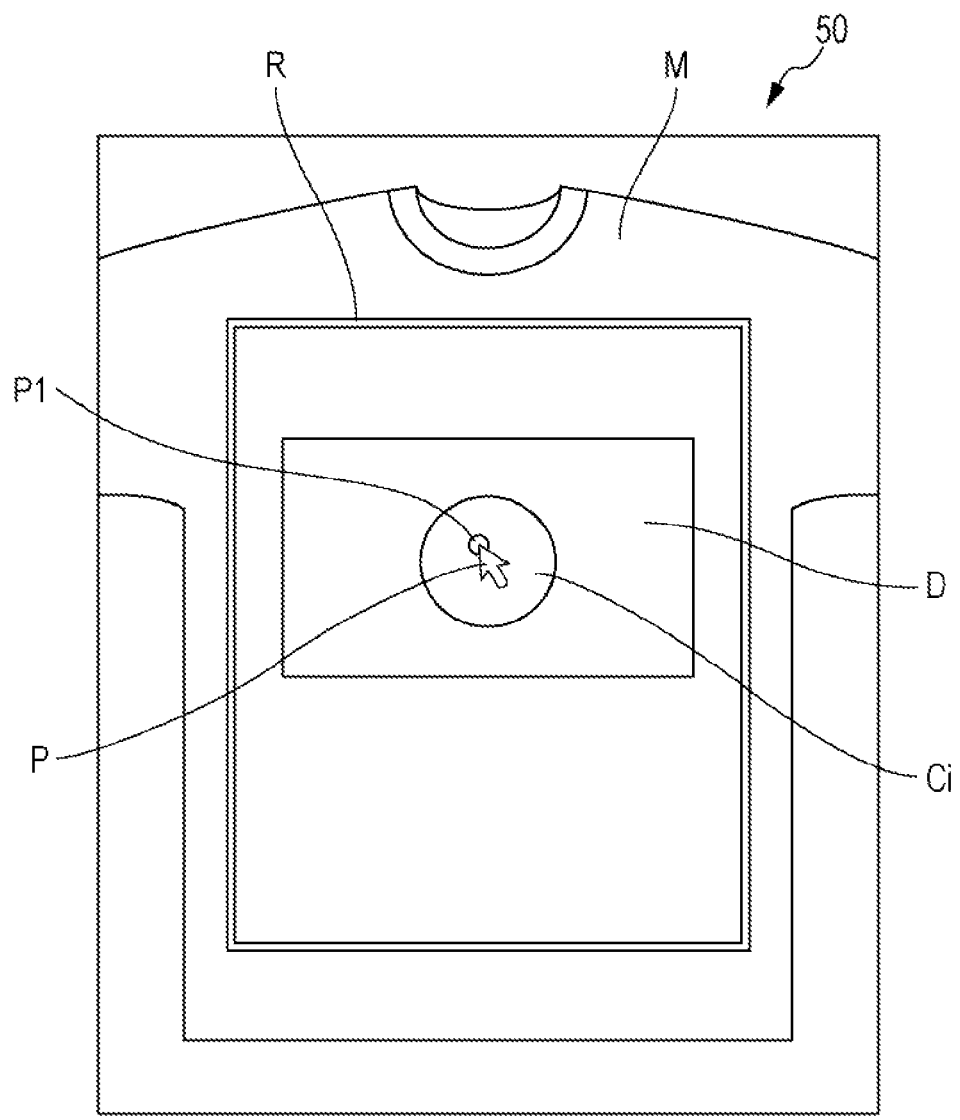
FIG. 5 is a diagram illustrating a display screen for use in selection of a partial pixel from among pixels constituting image data displayed on a monitor, according an embodiment of the invention.

The PC 21 is capable of generating recording data for use in recording operation of the recording apparatus 1 on the basis of image data. The monitor 31 has a role as the display portion for image data, according to the first aspect of the invention. Further, a user can select a partial pixel from among pixels constituting image data displayed on the monitor 31 by using the keyboard 29 and the mouse device 30. That is, the keyboard 29 and the mouse device 30 each have a role as the selection portion according to the first aspect of the invention. FIG. 5 illustrates a display screen 50 that is used when selecting a partial pixel from pixels constituting image data displayed on the monitor 31.

Figure 6:
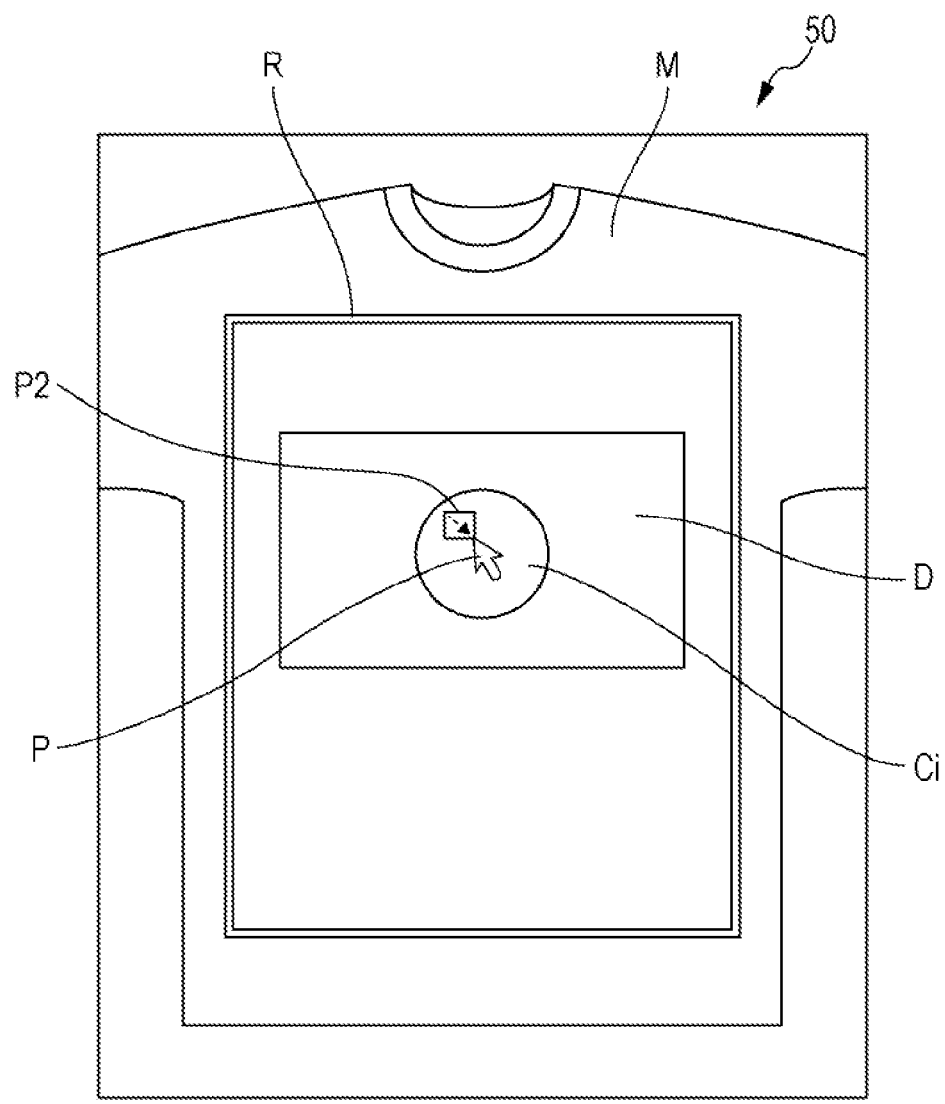
FIG. 6 is a diagram illustrating a display screen for use in selection of pixels included in a partial area from among pixels constituting image data displayed on a monitor, according an embodiment of the invention.

An image D based on image data is displayed inside an area R which is included in the recording target medium M (a T-shirt) and which is supported by the medium supporting tray 2. FIG. 5 illustrates a state where a user has selected a partial pixel P1 from among pixels constituting the image D displayed on the monitor 31 by moving a pointer P to a desired position with the mouse device 30 and by clicking a button (not illustrated) on the mouse device 30. In addition, as shown in FIG. 6, a user can also select pixels P2 falling within a given area by moving the pointer P in the arrowed direction (denoted by the slotted line shown in FIG. 6) while keeping the button of the mouse device 30 in a pushed down state. In this case, a color range setting portion described below is capable of setting a color range on the basis of an average value of the pixels P2 falling within the given area.

Further, a user can set a color range for the image data displayed on the monitor 21 on the basis of the partial pixel P1 by using the keyboard 29 and the mouse device 30. That is, the monitor 31, the keyboard 29 and the mouse device 30 each have a role of the color range setting portion according to the first aspect of the invention. FIG. 7 illustrates a color range setting screen for designating pixels to be color converted.

Displayed on a color range setting screen 100 are RGB values 101 of the pixel P1 that a user has selected on the display screen 50. In addition, this display is not limited to such a display using the RGB values, but may be a display using L*a*b* values, or may be a display employing a different method.

Further displayed is a setting portion 102 for setting a post-conversion color of pixels to be color converted. The setting portion 102 employs a drop-down control, and is configured such that an operation of clicking a button on the mouse device 30 under the state where the setting portion 102 is pointed by the pointer P enables selection of any one of "transparent color", "white color" and "designated color". Here, when "designated color" is selected, a screen for inputting RGB values as a color of "designated color" is displayed, and a user can set any color as the color of "designated color". In addition, "transparent color" is selected in this embodiment.

Further displayed are selected color range designation portions 103, each for setting a color range of pixels to be color converted. The selected color range designation portions 103 are each displayed so as to be associated with a corresponding one of the three RGB colors. For each of the RGB colors, a user can set a color range for pixels to be color converted by using the mouse device 30 to adjust a corresponding one of a pair of levers 104a and 104b, a pair of levers 105a and 105b and a pair of levers 106a and 106b. Namely, the selected color range designation portions 103 are configured so as to (when relative RGB values (that is, relative gray-scale levels) each associated with a corresponding one of the RGB values 101 of the pixel P1 are made "0") allow a user to determine, for each of the RGB colors, a minimum relative gray-scale level and a maximum relative gray-scale level of a color range for pixels to be color converted. In addition, in this embodiment, the number of gray-scale levels is 256.

For example, in a selected color range R, a minimum relative gray-scale level of "−3" and a maximum gray-scale level of "+3" of a color range are set by using the lever 104a and the lever 104b, respectively. This means that pixels each having a relative R value (that is, a relative gray-scale level for an R color) larger than or equal to "−3" and smaller than or equal to "+3" relative to an R value of "128" in the RGB values 101 of the pixel P1 can be selected. In other words, pixels each having an R value larger than or equal to "125" and smaller than or equal to "131" can be selected.

Meanwhile, in a selected color range G, a minimum relative gray-scale level of "−3" and a maximum gray-scale level of "+3" of a color range are set by using the lever 105a and the lever 105b, respectively, and similarly, in a selected color range B, a minimum relative gray-scale level of "−3" and a maximum gray-scale level of "+3" of a color range are set by using the lever 106a and the lever 106b, respectively. Nevertheless, this means that, since a G value and a B value in the RGB value 101 of the pixel P1 are each "0", even though the minimum relative gray-scale level of "−3" and the maximum gray-scale level of "+3" of a color range are set, pixels each having a G value and a B value each larger than or equal to "0" and smaller than or equal to "3" can be selected.

In such a way as described above, in this embodiment, pixels each having an R value larger than or equal to "125" and smaller than or equal to "131", a G value larger than or equal to "0" and smaller than or equal to "3", and a B value larger than or equal to "0" and smaller than or equal to "3" are selected.

On the basis of this setting, the PC 21 sequentially determines whether or not a pixel constituting the image D corresponds to the above color range, until a pixel adjacent to a determination-completed pixel becomes a pixel not corresponding to the above color range. That is, the PC 21 has a role of the determination portion according to the first aspect of the invention, which determines whether or not a given pixel corresponds to the above color range. The PC 21 also has a role of the determination practice portion according to the first aspect of the invention, which causes the determination portion to practice the above determination. Further, in this embodiment, pixels constituting a circular shaped image Ci in the image D correspond to the above color range (and thus, the pixels constituting the circular shaped image Ci) are designated by the PC 21, which also has a role of the pixel designation portion according to the first aspect of the invention.

In addition, a cancel button 107 for cancelling the above settings and a storage button 108 for storing the above settings are displayed on the color range setting screen 100.

Further, colors (each associated with a corresponding one of the pixels constituting the circular shaped image Ci and having been designated by the PC 21 in such a way as described above) are converted into a color having been set in the setting portion 102 by the PC 21, which also has a role of the color conversion portion according to the first aspect of the invention. In this embodiment, the color having been set in the setting portion 102 is "transparent color", and thus, each piece of color data associated with a corresponding one of the pixels constituting the circular shaped image Ci is converted into a piece of data based on a color reflecting a color of the recording target medium M (that is, the piece of data indicating that recording is unnecessary).

Further, the PC 21, which also has a role of the recording data generation portion according to the first aspect of the invention, generates recording data on the basis of the image data having been color converted in such a way as described above.

In addition, the recording system of this embodiment is configured so as to be capable of retrieving an image of the recording target medium M. Moreover, the recording system of this embodiment is capable of displaying this retrieved image on the monitor 31 as shown in FIG. 5, and further, is also capable of displaying a template stored in the ROM 24 thereon.

Further, in this embodiment, the ROM 24 has a role as the storage portion according to the third aspect of the invention, which stores therein pre-conversion colors each associated with a corresponding one of pixels which have been designated as pixels to be color converted by the PC 21. The PC 21 is capable of designating a post-conversion color of each of the designated pixels by varying a pre-conversion color of the each of the designated pixels such that an amount of the variation corresponds to an amount of a variation of a pre-conversion color (which is associated with any one of the designated pixels and is stored in the ROM 24). For example, it is assumed here that an R value, a G value and a B value of a pre-conversion color of a first pixel of the designated pixels are "128", "0" and "0", respectively, and an R value, a G value and a B value of a post-conversion color of the first pixel are "128", "1" and 1", respectively. In this case, when an R value, a G value and a B value of a pre-conversion color of a second pixel of the designated pixels are "127", "0" and "0", respectively, it is possible to perform a color conversion of the second pixel such that an R value, a G value and a B value of a post-conversion color of the second pixel become "127", "1" and "1", respectively.

Further, in the PC 21 of this embodiment, a data processing method for a color conversion of the designated pixels into a transparent color or a white color is different from that for a color conversion of the designated pixels into a designated color. When performing recording in the designated color, sometimes, irrespective of color matching and the like, recording in a specific color is performed with respect to a specific mark and the like. Thus, there are some cases where a data processing method is required that is different from that for recording in the transparent color or the white color. According to this embodiment, even in such a case, it is possible to deal with such a requirement without any trouble.

When converting data corresponding to each of the designated pixels into data based on the transparent color or the white color, the PC 21 of this embodiment directly converts RGB data into CMYK data. Further, when converting data corresponding to each of the designated pixels into data based on the designated color, the PC 21 converts the RGB data into different RGB data, and then, converts the different RGB data into CMYK data.

Further, as shown in FIG. 6 the PC 21 of this embodiment is also capable of selecting the pixels P2 falling within a given area when selecting pixels to be color converted. In this case, it is possible to set a color range on the basis of an average value of the pixels P2 falling within the given area. Moreover, the PC 21 of this embodiment is configured so as to be capable of further selecting a partial pixel from among pixels included in the color range having been set in the manner described above. Through setting a color range on the basis of the pixels having been selected in as the manner described above, it is possible to designate pixels to be targeted for designation for the purpose of a color conversion with further accuracy, particularly in image data including various colors in a narrow area.

FIG. 8A and FIG. 8B are diagrams each illustrating a color range setting screen for designating pixels to be color converted, according to another embodiment.

In this embodiment, it is possible to select, as a method for designating pixels to be color converted, a method for setting a range on an RGB-value basis by using a screen shown in FIG. 8A or a method for visually setting a range by using a screen shown in FIG. 8B. It is possible to select any one of the methods for setting a range on an RGB-value basis and the method for visually setting a range by using a selection portion 109. Further, it is possible to perform setting of a color range for pixels to be color converted by using the levers L, just like in the aforementioned embodiment.

Embodiment of Program

The aforementioned embodiment is an embodiment of the PC 21 functioning as a recording data generation apparatus, as well as a recording system including the PC 21 and the recording apparatus 1. Moreover, a program for allowing a computer such as the PC 21 to function just like in the aforementioned embodiment is also included in the invention.

Embodiment of Recording Data Generation Method
(FIG. 9)

Next, an embodiment of a recording data generation method according to an aspect of the invention will be described.

Figure 9:
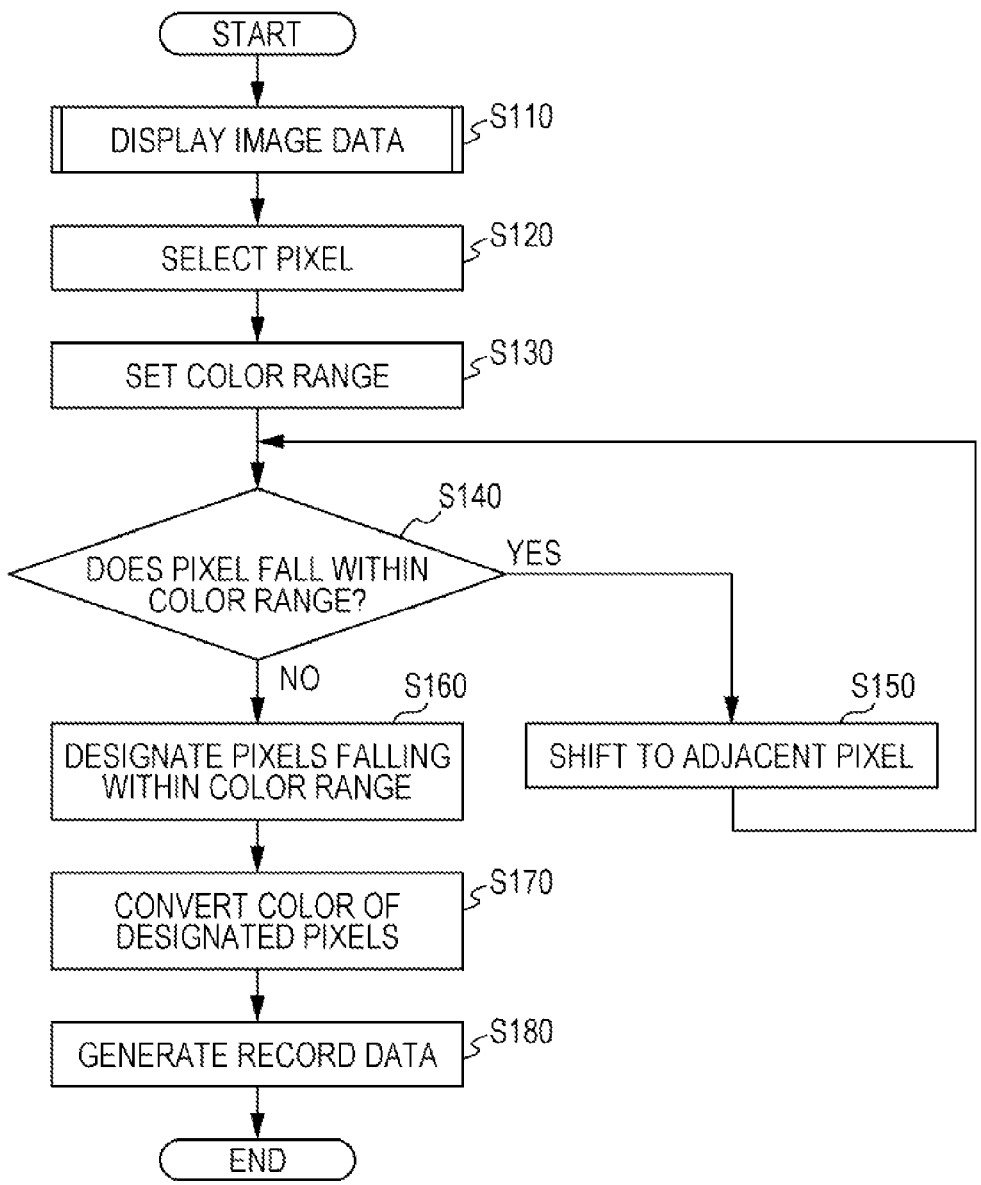
FIG. 9 is a flowchart illustrating a recording data generation method according to an embodiment of the invention.

FIG. 9 is a flowchart illustrating a recording data generation method according to an embodiment of the invention.

In addition, the recording data generation method of this embodiment is an embodiment using the aforementioned recording system.

In the recording data generation method of this embodiment, in step S110, image data for use in generation of recording data is displayed on the monitor 31. In addition, this display of image data is a display of image data corresponding to that shown in FIG. 5 or FIG. 6, and is always performed during operations of individual steps described below.

Next, in step S120, a partial pixel among pixels to be color converted is selected from among pixels constituting the image data displayed on the monitor 31.

Next, in step S130, a user sets a color range on the basis of the partial pixel as a step for designating an area of pixels to be color converted. A screen which is displayed on the monitor 31 and is for use in the setting of the color range is just like the screen illustrated in FIG. 7, FIG. 8A or FIG. 8B.

Next, in step S140, it is determined whether or not a pixel constituting the image data is a pixel corresponding to the color range, and in the case where the relevant pixel is a pixel corresponding to the color range, the process flow proceeds to step S150. After a pixel targeted for the above determination is shifted to a pixel adjacent to a determination-completed pixel, the process flow returns to step S140.

That is, through the repetition of steps S140 and S150, the determination as to whether or not a pixel constituting the image data is a pixel corresponding to the color range is sequentially made on the basis of the partial pixel, until a pixel adjacent to a determination-completed pixel becomes a pixel not corresponding to the color range.

Next, in step S160, pixels, each having been determined as a pixel corresponding to the color range through the repetition of steps S140 and S150, are designated. That is, an area of pixels to be color converted is designated in this step.

Next, in step S170, a color of each of the pixels having been designated in step S160 is converted into a desired color. In addition, in this embodiment, it is possible to perform conversion into any one of the transparent color, the white color and the designated color.

Next, in step S180, recording data is generated on the basis of image data corresponding to the pixels having been color converted in step S170.

Figure 10:
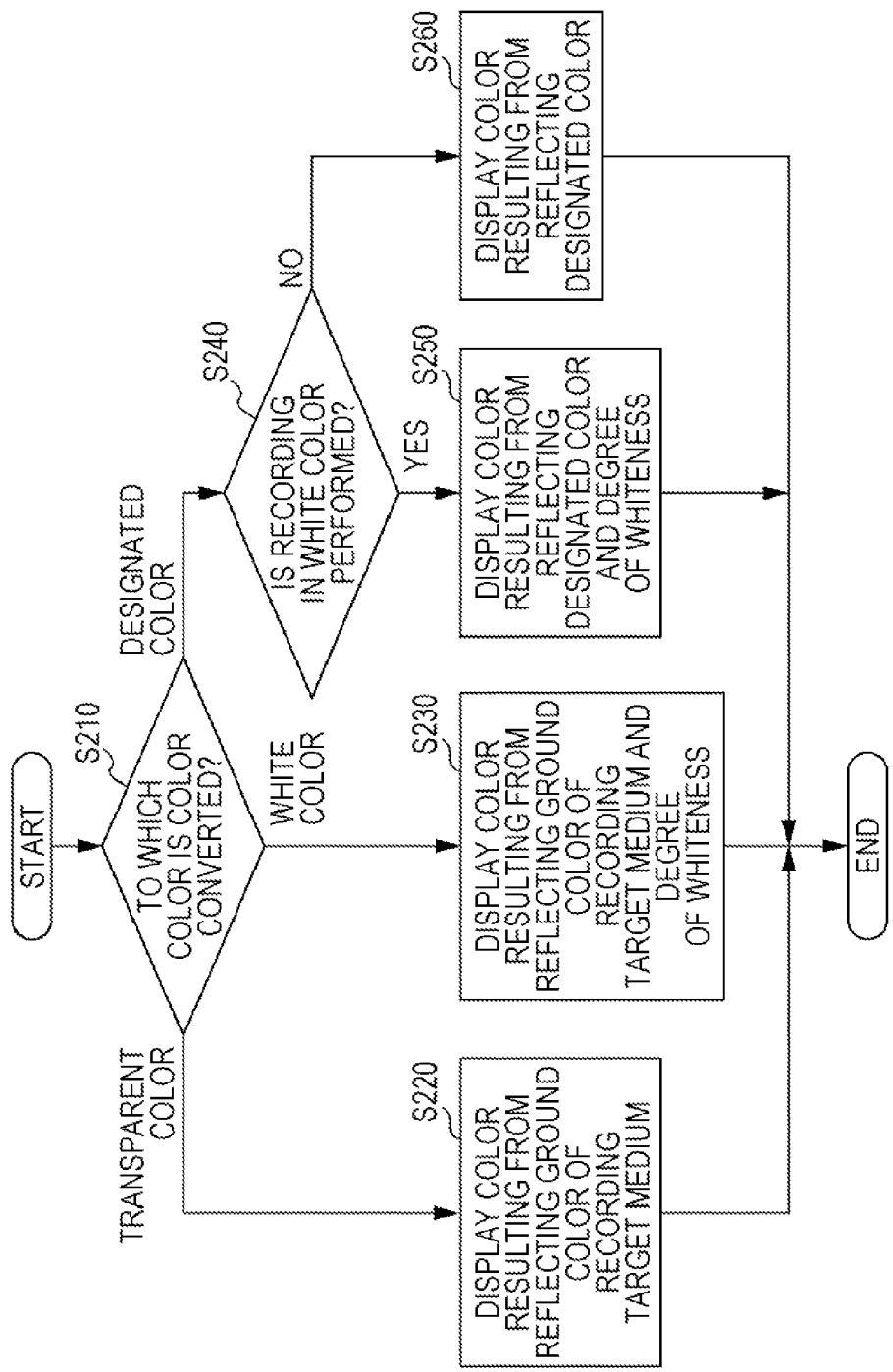
FIG. 10 is a flowchart illustrating an image data display method according to an embodiment of the invention.

Embodiment of Image Data Display Method (FIG. 10)

Next, an embodiment of an image data display method according to an aspect of the invention will be described.

FIG. 10 is a flowchart illustrating an image data display method according to an embodiment of the invention.

In addition, the image data display method of this embodiment is an embodiment using the aforementioned recording system, and is an image data display method corresponding to step S110 of the above recording data generation method.

In the image data display method of this embodiment, in step S210, it is determined which one of a transparent color, a white color and a desired designated color a color of each of pixels to be color converted in step S170 of the above recording data generation method is set so as to be converted into.

In the case where the color of each of pixels to be color converted is set so as to be converted into the transparent color, the process flow proceeds to step S220. In that step, the pixels to be color converted are displayed on the monitor 31 such that the color of each of the pixels to be color converted reflects a ground color of the recording target medium M.

In the case where the color of each of the pixels to be color converted is set so as to be converted into the white color, the process flow proceeds to step S230. In that step, the pixels to be color converted are displayed on the monitor 31 such that the color of each of the pixels to be color converted reflects a ground color of the recording target medium M and a degree of whiteness corresponding to a recording density of a white ink in recording in the white color.

In the case where the color of each pixels to be color converted is set so as to be converted into the desired designated color, the process flow proceeds to step S240. In that step, it is determined whether or not recording in the white color is to be further performed prior to recording in the desired designated color.

In the case where further recording in the white color is performed, in step S250, the pixels to be color converted are displayed on the monitor 31 such that the color of each of the pixels to be color converted reflects a color of the designated color and a degree of whiteness corresponding to a recording density of a white ink in recording in the white color.

In the case where the further recording in the white color is not performed, in step S260, the pixels to be color converted are displayed on the monitor 31 such that the color of each of the pixels to be color converted reflects a color of the designated color. In addition, in step S260, the pixels to be color converted are displayed on the monitor 31 such that the color of each of the pixels to be color converted reflects a ground color of the recording target medium M and a color of the designated color under the state where a transmittance of the color of the designated color is set in advance.

Figure 11:
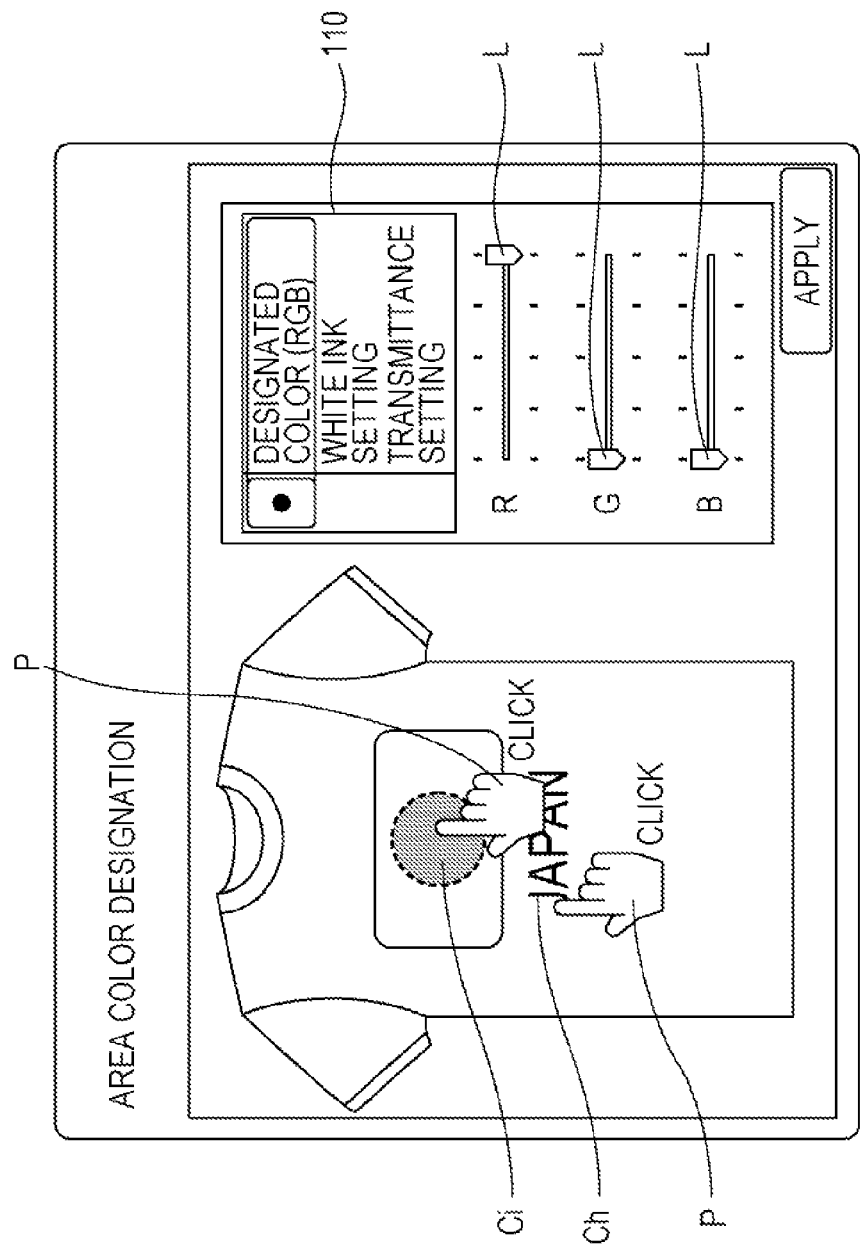
FIG. 11 is an example of a display of image data in a designated color, according to an embodiment of the invention.
Figure 12:
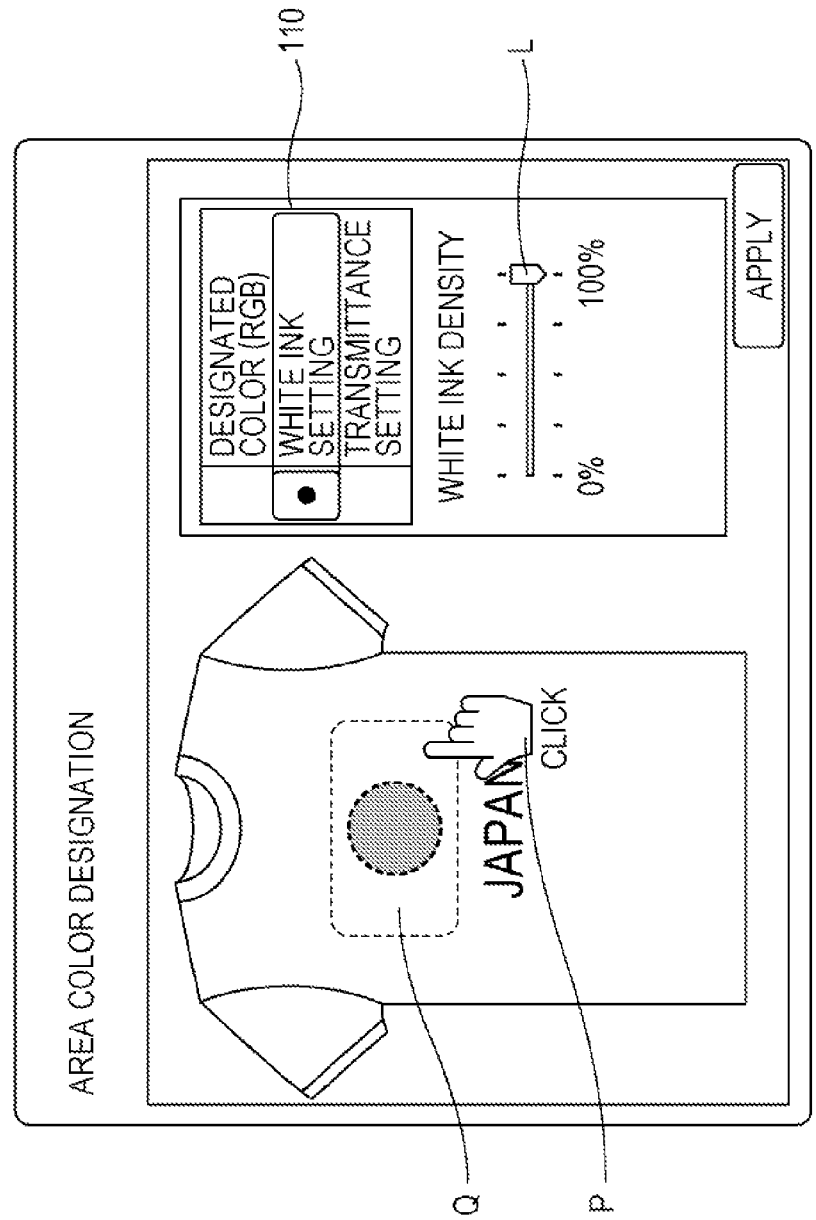
FIG. 12 is an example of a display of image data in a white color, according to an embodiment of the invention.
Figure 13:
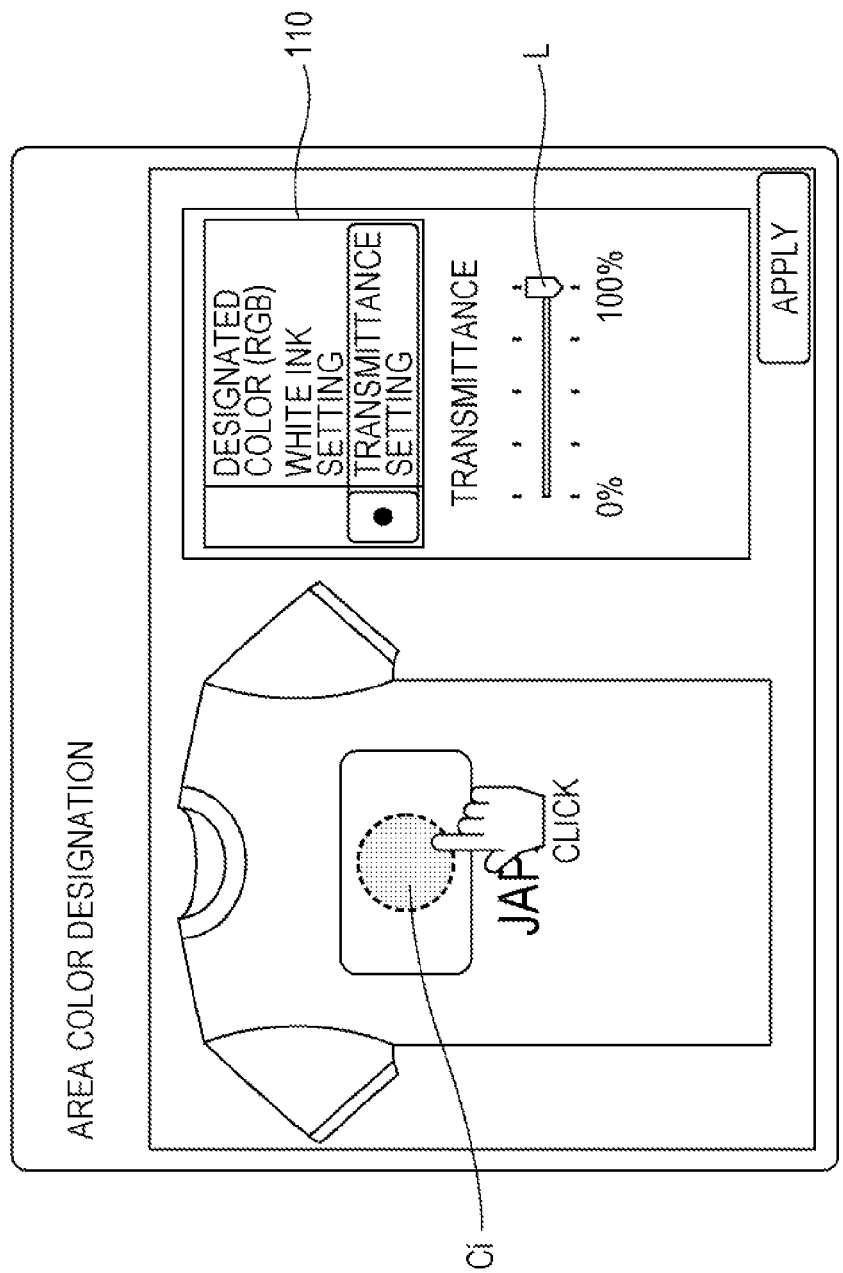
FIG. 13 is an example of a display of image data in a designated color under the state where a transmittance of the image data is set in advance, according to an embodiment of the invention.

FIGS. 11 to 14 are each an example of a display of image data. FIG. 11 is an example of a display of image data in a designated color; FIG. 12 is an example of a display of image data in a white color; FIG. 13 is an example of a display of image data in a designated color under the state where a transmittance of image data is set in advance; and FIG. 14 is an example of a display of image data in a different designated color.

FIG. 11 is an example of a display of image data in a designated color. When "designated color (RGB)" has been selected in a color selection portion 110, and each of an R value, a G value and a B value has been selected by using a corresponding one of levers L, areas designated by pointing a pointer P and performing clicking (in this case, the areas being a circular shaped image Ci and a character "J" of a character image Ch) are displayed in the designated color having been selected in the color selection portion 110.

FIG. 12 is an example of a display of image data in a white color. When "white ink setting" has been selected in a color selection portion 110, and "white color density" has been selected by using a lever L, an area designated by pointing a pointer P and performing clicking, (in this case, the area being a quadrangular shaped image Q) is displayed with the white ink density having been selected in the color selection portion 110 (that is, the area is displayed in a color reflecting a ground color of the recording target medium M and a degree of whiteness corresponding to a recording density of a white ink in recording in the white color).

FIG. 13 is an example of a display of image data in a designated color under the state where a transmittance of the image data is set in advance. When "transmittance setting" has been selected in a color selection portion 110, and "transmittance" has been selected by using a lever L, an area designated by pointing a pointer P and performing clicking (in this case, the area being a circular shaped image Ci) is displayed with the transmittance having been selected in the color selection portion 110 (that is, the area is displayed in a color reflecting a ground color of the recording target medium M and the color of the designated color).

FIG. 14 is a diagram illustrating an example of a display of image data in a designated color. In addition, (a) of FIG. 14 and (b) of FIG. 14 illustrate a pre-color-conversion image and a post-color-conversion image, respectively. When "designated color (RGB)" has been selected in a color selection portion 110, and each of an R value, a G value and a B value has been selected by using a corresponding one of levers L, an area designated by pointing a pointer P and performing clicking (in this case, the area being a flower image F) is displayed in the color having been selected in the color selection portion 110 under the state where the gradation of the pre-color-conversion image is kept in the gradation of the post-color-conversion image. That is, a pre-conversion color of each of pixels constituting a pre-color-conversion image F, shown in (a) of FIG. 14, is stored in the ROM 24, and a post-color-conversion image F, shown in (b) of FIG. 14, is displayed by performing color conversion of the pre-color-conversion image F, that is, by varying the stored pre-conversion color of each of the pixels constituting the pre-color-conversion image F such that an amount of the variation corresponds to an amount of a variation of a pre-conversion color which is associated with any one of the pixels constituting the pre-color-conversion image F and is stored in the ROM 24.

What is claimed is:

1. A recording data generation apparatus comprising:
   a display portion that displays image data;
   a selection portion that allows selection of a partial pixel from among pixels constituting the image data displayed on the display portion;
   a pixel designation portion that designates continuously adjacent pixels from the partial pixel that fall within a color range that is based on the color of the partial pixel; and
   a color conversion portion that converts a color of the continuously adjacent pixels designated by the pixel designation portion, wherein the color conversion portion converts the color of all the continuously adjacent pixels to the same post-conversion color.

2. The recording data generation apparatus according to claim 1, wherein the pixel designation portion is practiced sequentially until the pixels constituting the image data becomes a pixel not falling within the color range.

3. The recording data generation apparatus according to claim 1, further comprising a recording data generation portion that generates recording data on the basis of image data resulting from the color conversion by the color conversion portion.

4. A recording data generation method comprising:
   displaying image data on a display portion;
   selecting a partial pixel from among pixels constituting the image data displayed on the display portion;
   designating continuously adjacent pixels from the partial pixel that fall within a color range based on the color of the partial pixels; and
   converting a color of the continuously adjacent pixels to the same post-conversion color.

* * * * *